US012101710B2

(12) United States Patent
Zhang

(10) Patent No.: US 12,101,710 B2
(45) Date of Patent: Sep. 24, 2024

(54) DATA PROCESSING METHOD AND APPARATUS, NETWORK ELEMENT DEVICE, STORAGE MEDIUM, AND PROGRAM PRODUCT

(71) Applicant: Tencent Technology (Shenzhen) Company Limited, Shenzhen (CN)

(72) Inventor: Zhouyun Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/201,097

(22) Filed: May 23, 2023

(65) Prior Publication Data
US 2023/0300726 A1    Sep. 21, 2023

Related U.S. Application Data

(63) Continuation of application No. PCT/CN2022/102185, filed on Jun. 29, 2022.

(30) Foreign Application Priority Data

Jul. 21, 2021 (CN) .......................... 202110827610.9

(51) Int. Cl.
H04W 48/16 (2009.01)
H04L 67/141 (2022.01)
H04W 80/12 (2009.01)

(52) U.S. Cl.
CPC ........... *H04W 48/16* (2013.01); *H04L 67/141* (2013.01); *H04W 80/12* (2013.01)

(58) Field of Classification Search
CPC .... H04W 48/16; H04W 80/12; H04L 67/141; H04L 67/14; H04L 61/4511; H04L 67/10; H04L 67/51
See application file for complete search history.

(56) References Cited

U.S. PATENT DOCUMENTS

2020/0329008 A1    10/2020  Dao
2021/0111953 A1     4/2021  Hall et al.
(Continued)

FOREIGN PATENT DOCUMENTS

CN    111083737 A    4/2020
CN    111629401 A    9/2020
(Continued)

OTHER PUBLICATIONS

Lenovo et al., "Reducing Interaction Frequency for Serve Discovery—23.548", S2-2105146, 3GPP TSG SA WG2, Meeting #145e, Elbonia, May 17-28, 2021, 10 pgs.
(Continued)

*Primary Examiner* — Michael A Keller
*Assistant Examiner* — Thao D Duong
(74) *Attorney, Agent, or Firm* — Morgan, Lewis & Bockius LLP

(57) ABSTRACT

This application discloses a data processing method performed by a computer device acting as a session management network element. The method includes: generating a node-level message processing rule set, where the message processing rule set includes one or more message processing rules; and distributing, when the session management network element establishes a connection with an edge application server discovery network element, the message processing rule set to the edge application server discovery network element, so that the edge application server discovery network element processes a received domain name system message according to the message processing rule set in a subsequent protocol data unit session process. According to this application, the processing efficiency of the domain name system message may be improved.

17 Claims, 7 Drawing Sheets

(56) References Cited

U.S. PATENT DOCUMENTS

| | | | | |
|---|---|---|---|---|
| 2021/0273977 A1* | 9/2021 | Karasaridis | ............. | H04L 63/20 |
| 2022/0286431 A1* | 9/2022 | Winn | ....................... | H04L 63/20 |
| 2024/0179118 A1* | 5/2024 | Wei | ..................... | H04L 61/4541 |
| 2024/0179516 A1* | 5/2024 | Wu | ........................ | H04W 12/06 |
| 2024/0187374 A1* | 6/2024 | Tang | ................... | H04L 61/4511 |

FOREIGN PATENT DOCUMENTS

| | | |
|---|---|---|
| CN | 113079498 A | 7/2021 |
| CN | 113115480 A | 7/2021 |
| CN | 113572835 A | 10/2021 |
| CN | 113572864 A | 10/2021 |
| WO | WO 2017220158 A1 | 12/2017 |
| WO | WO 2021042398 A1 | 3/2021 |
| WO | WO 2021052080 A1 | 3/2021 |
| WO | WO 2021064717 A1 | 4/2021 |
| WO | WO 2021092441 A1 | 5/2021 |

OTHER PUBLICATIONS

Tencent Technology, ISR, PCT/CN2022/102185, Oct. 10, 2022, 2 pgs.
Tencent Technology, WO, PCT/CN2022/102185, Oct. 10, 2022, 5 pgs.
Tencent Technology, IPRP, PCT/CN2022/102185, Jan. 18, 2024, 6 pgs.

\* cited by examiner

DATA PROCESSING METHOD AND APPARATUS, NETWORK ELEMENT DEVICE, STORAGE MEDIUM, AND PROGRAM PRODUCT

CROSS-REFERENCE TO RELATED APPLICATIONS

This application is a continuation application of PCT Patent Application No. PCT/CN2022/102185, entitled "DATA PROCESSING METHOD AND APPARATUS, NETWORK ELEMENT DEVICE, STORAGE MEDIUM, AND PROGRAM PRODUCT" filed on Jun. 29, 2022, which claims priority to Chinese Patent Application No. 202110827610.9 filed with the Chinese Patent Office on Jul. 21, 2021, and entitled "DATA PROCESSING METHOD, NETWORK ELEMENT DEVICE, AND READABLE STORAGE MEDIUM", both of which is incorporated by reference in its entirety.

FIELD OF THE TECHNOLOGY

This application relates to the field of communication technologies, and particularly, to a data processing method, a network element device, and a readable storage medium.

BACKGROUND OF THE DISCLOSURE

Along with the popularization and rapid development of terminal devices, the amount of data generated by network edges is rapidly increased, and the development of edge computing is further promoted.

Currently, in the 5th generation (5G) mobile communication technology supporting edge computing, a terminal device (user equipment, UE) may obtain edge application service by means of an edge application server (EAS). Before obtaining the edge application service, the terminal device needs to first discover the Internet protocol (IP) address of an appropriate EAS, and an EAS discovery manner may be querying and obtaining the IP address of the edge application server according to a domain name system (DNS) mechanism. In this process, a session management network element (session management function, SMF) in a 5G core network may configure, on an edge application server discovery network element (EASDF), a DNS message processing rule for forwarding and processing a DNS message, and the rule is transmitted on the basis of a single protocol data unit (PDU) session of a single terminal device. That is to say, for different PDU sessions of a same UE, the DNS message processing rule may be distributed during the creation of the PDU sessions. For the PDU sessions of different UEs, the DNS message processing rule may also be distributed during the creation of the PDU sessions. In addition, in a same PDU session process, for each request message or response message, it is needed that the SMF and the EASDF interact with each other to update the DNS message processing rule to process a corresponding message.

However, this manner relates to the frequent request and distribution of the DNS message processing rule. Every when the PDU session is created, or a DNS request is received, or a DNS response is received, the request and distribution of the DNS message processing rule may be triggered, thereby causing the EASDF to have a complex processing procedure, and rendering the processing efficiency of the DNS message low.

SUMMARY

Embodiments of this application provide a data processing method and apparatus, a network element device, a storage medium, and a program product, capable of improving the processing efficiency of a domain name system message.

According to one aspect of the embodiments of this application, a data processing method is performed by a computer device acting as a session management network element and the method includes:
  generating a node-level message processing rule set, the message processing rule set including one or more message processing rules; and
  distributing, when the session management network element establishes a connection with an edge application server discovery network element, the message processing rule set to the edge application server discovery network element, so that the edge application server discovery network element processes a received domain name system message according to the message processing rule set in a subsequent protocol data unit session process.

According to one aspect of the embodiments of this application, a data processing method is provided. The method is executed by a policy control network element and includes:
  generating a node-level message processing rule set, the message processing rule set including one or more message processing rules; and
  distributing the message processing rule set to an edge application server discovery network element, so that the edge application server discovery network element processes a received domain name system message according to the message processing rule set in a subsequent protocol data unit session process.

According to one aspect of the embodiments of this application, a data processing method is provided. The method is executed by an edge application server discovery network element and includes:
  obtaining, when a session management network element establishes a connection with the edge application server discovery network element, a node-level message processing rule set, the message processing rule set including one or more message processing rules; and
  obtaining, when the edge application server discovery network element receives a domain name system message, a target message processing rule from the one or more message processing rules, and processing the domain name system message according to the target message processing rule.

According to one aspect of the embodiments of this application, a network element apparatus is provided. The apparatus is deployed on a session management network element and includes:
  a rule generation module, configured to generate a node-level message processing rule set, the message processing rule set including one or more message processing rules; and
  a rule distribution module, configured to distribute, when the session management network element establishes a connection with an edge application server discovery network element, the message processing rule set to the edge application server discovery network element, so that the edge application server discovery network element processes a received domain name system message according to the message processing rule set in a subsequent protocol data unit session process.

According to one aspect of the embodiments of this application, a network element apparatus is provided. The apparatus is deployed on a policy control network element and includes:

a rule generation module, configured to generate a node-level message processing rule set, the message processing rule set including one or more message processing rules; and a rule distribution module, configured to distribute the message processing rule set to an edge application server discovery network element, so that the edge application server discovery network element processes a received domain name system message according to the message processing rule set in a subsequent protocol data unit session process.

According to one aspect of the embodiments of this application, a network element apparatus is provided. The apparatus is deployed on an edge application server discovery network element and includes:

a rule obtaining module, configured to obtain, when a session management network element establishes a connection with the edge application server discovery network element, a node-level message processing rule set, the message processing rule set including one or more message processing rules; and a message processing module, configured to obtain, when the edge application server discovery network element receives a domain name system message, a target message processing rule from the one or more message processing rules, and process the domain name system message according to the target message processing rule.

According to one aspect of the embodiments of this application, a computer device acting as a session management network element is provided, including: a processor, a memory, and a network interface, the processor being connected to the memory and the network interface; the network interface being used for providing a data communication network element; the memory being used for storing a computer program; and the processor being used for invoking the computer program to cause the computer device to implement the method according to the embodiments of this application.

According to one aspect of the embodiments of this application, a non-transitory computer-readable storage medium is provided. The computer-readable storage medium stores a computer program, and the computer program is suitable for being loaded and executed by a processor of a computer device acting as a session management network element and causes the computer device to implement the method according to the embodiments of this application.

According to one aspect of the embodiments of this application, a computer program product or a computer program is provided. The computer program product or the computer program includes a computer instruction; the computer instruction is stored in a computer-readable storage medium; a processor of a network element device reads the computer instruction from the computer-readable storage medium; and the processor executes the computer instruction, causing the network element device to implement the method according to the embodiments of this application.

The embodiments of this application may support that the session management network element generates the node-level message processing rule set, and may further distribute, when the session management network element establishes the connection with the edge application server discovery network element, the message processing rule set to the edge application server discovery network element, and after receiving the message processing rule set, the edge application server discovery network element may process the received domain name system message according to the message processing rule set in the subsequent protocol data unit session process. Hence, the transmitting condition of the node-level message processing rule set provided by the embodiments of this application does not rely on the creation of the protocol data unit session. That is to say, after the session management network element successfully distributes the message processing rule set to the edge application server discovery network element, if rule update is not involved, then no matter how many protocol data unit sessions are subsequently created, it is not needed to trigger the request and distribution of the message processing rule again. That is, it is not needed to frequently distribute the message processing rule for each protocol data unit session of each terminal device. In addition, the edge application server discovery network element may directly perform, in response to receiving the domain name system message, related processing on the domain name system message according to the received message processing rule set, so that the processing efficiency of the domain name system message may be improved.

BRIEF DESCRIPTION OF THE DRAWINGS

To describe the technical solutions in the embodiments of this application or in the related art more clearly, the accompanying drawings required for describing the embodiments are briefly introduced below. Apparently, the accompanying drawings in the following description show merely some embodiments of this application, and a person of ordinary skill in the art may still derive other accompanying drawings from these accompanying drawings without an inventive effort.

DESCRIPTION OF EMBODIMENTS

The technical solutions in embodiments of this application are clearly and completely described below with reference to the accompanying drawings in the embodiments of this application. Apparently, the described embodiments are merely some of the embodiments of this application but not all the embodiments. Based on the embodiments of this application, all other embodiments obtained by persons of ordinary skill in the art without involving an inventive effort shall fall within the scope of protection of this application.

Figure 1:
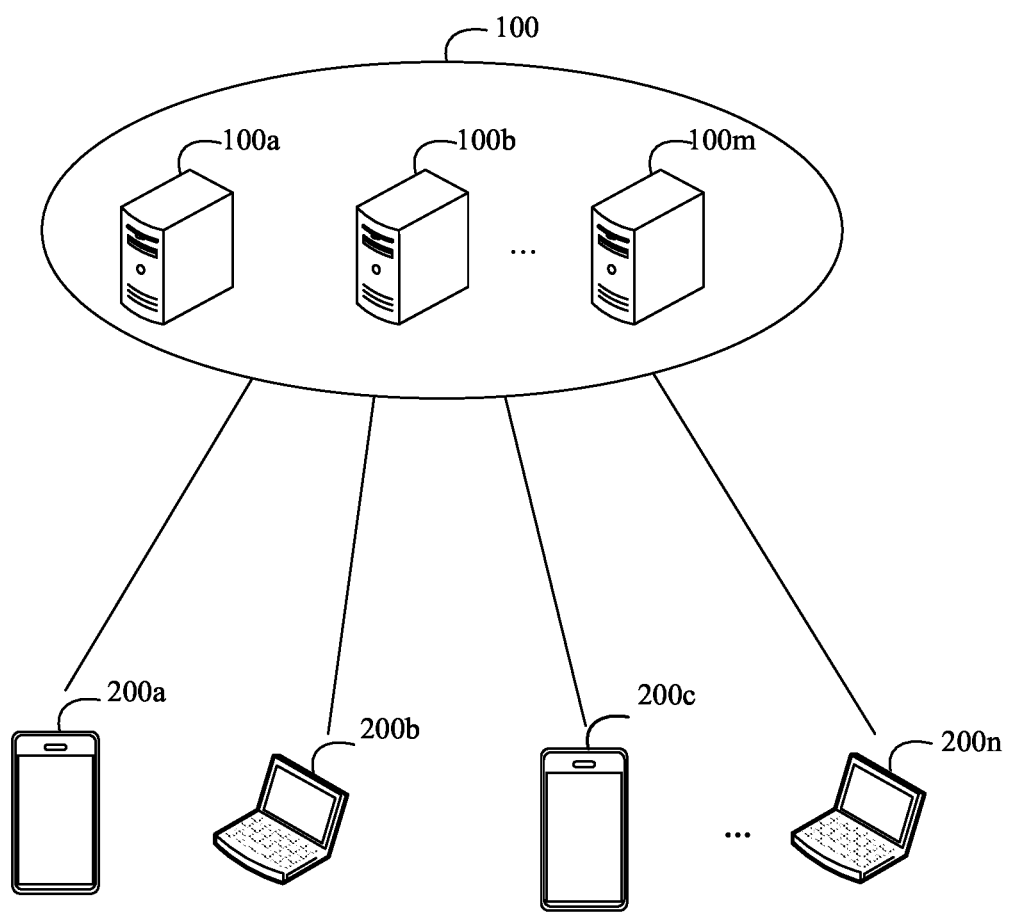
FIG. 1 is a schematic diagram of a system architecture provided by an embodiment of this application.

With reference to FIG. 1, FIG. 1 is a schematic diagram of a system architecture provided by an embodiment of this application. The system architecture may be applied to a service scene supporting edge computing. Edge computing refers to that a platform fusing a network, computing, storage, and application core capabilities at a network edge side close to an object or a data source nearby provides edge intelligent service to satisfy the key requirements of industry digitalization in the aspects of agile connection, real-time service, data optimization, application intelligence, security and privacy protection, etc. Edge computing enables an operator and third-party service to be able to be close to an access point of a terminal device for hosting, thereby achieving efficient service delivery by reducing the end-to-end delay and load of a transmission network.

The 5th generation mobile communication technology (referred to as 5G) is a new-generation broadband mobile communication technology having the characteristics of high rate, low delay, and large connection, and is a network infrastructure that realizes man-machine-object interconnection. The international telecommunication union (ITU) defines typical scenes in 5G applications, including: enhanced mobile broadband (eMBB), ultra-reliable and low latency communication (URLLC), massive machine type of communication (mMTC), and vehicle to everything (V2X), etc. On one hand, the aforementioned eMBB scene provides large-traffic mobile broadband services, including high-speed download, a high-definition video, virtual reality (VR)/augmented reality (AR), etc. The peak rates of these services generally exceed 10 Gbps, and a required bandwidth is up to several dozen Gbps, and thus, great pressure may be caused to wireless transmission and backhaul networks. Therefore, these service requirements need that the services are transferred to the network edge as much as possible to achieve the local breakout of the services. On the other hand, the URLLC scene and the V2X scene may provide ultra-reliable and ultra-low latency communication, such as autonomous driving, industrial control, and telemedicine, and requires end-to-end high reliability of 99.999% and end-to-end ultra-low latency less than 1 ms. Therefore, these service requirements also need that the services are transferred to the network edge to reduce network delay caused by network transmission and multi-level service forwarding.

It may be known from the aforementioned content that the popularization of 5G increases requirements for edge computing. In addition, the combined use of edge computing and 5G may help a network encountering a sudden and continuous traffic surge situation to solve the problems of bandwidth, speed, and security.

As shown in FIG. 1, the system architecture may include an edge data center 100 and a terminal cluster. The terminal cluster may include: a terminal device 200a, a terminal device 200b, a terminal device 200c, . . . , and a terminal device 200n. The edge data center 100 may include a plurality of edge application servers (EAS), such as an edge application server 100a, an edge application server 100b, . . . , and an edge application server 100m. Communicative connections may exist between the terminal devices included in the terminal cluster. For example, a communicative connection exists between the terminal device 200a and the terminal device 200b, and a communicative connection exists between the terminal device 200a and the terminal device 200c. Communicative connections may exist between the edge application servers. For example, a communicative connection exists between the edge application server 100a and the edge application server 100b. In addition, any one terminal device in the terminal cluster may be communicatively connected to any one edge application server in the edge data center 100. For example, a communicative connection exists between the terminal device 200a and the edge application server 100a. The aforementioned communicative connection does not define a connection manner that may be a 4G wireless access manner, and may also be a 5G wireless access manner. This application does not limit this herein.

It is to be that in mobile communication, the system architecture shown in FIG. 1 may further include an access network, a bearer network (a transmission network), and a core network. A plurality of base stations (e.g., a 5G base station gNB) may be deployed in the access network, and mainly perform access and management of the terminal device at a wireless side. The bearer network may be composed of the switching and routing devices of a series of operators, and is mainly used for transmitting control signaling and user data between the base station and the core network. A series of core network elements (the "network element" may also be referred to as a "network function") may be deployed in the core network, and these network elements synergistically perform authentication, charging, and mobility management, etc., on the terminal device. The access network and the bearer network are not described in detail herein.

In order to facilitate understanding and description of subsequent embodiments, the main core network elements involved in the embodiments of this application are first briefly introduced below.

(1) Session management function (SMF): mainly used for session creation and deletion, user plane selection and control, and user equipment Internet protocol (UE, i.e., a terminal device; IP) address allocation, etc. In the embodiments of this application, the SMF may also be referred to as a session management network element.

(2) User plane function (UPF): mainly used for data routing and forwarding of a mobile core network user plane, and being connected with an external data network (e.g., an operator service, Internet, or a third-party service, etc.). The UPF is a module for processing data in a 5G core network.

(3) Policy control function (PCF): mainly used for managing network behaviors by using a unified policy framework, and executing a related policy in coordination with user information in a unified data repository (UDR). In the embodiments of this application, the PCF may also be referred to as a policy control network element.

(4) Unified data repository (UDR): mainly used for structuring storage and retrieval of service, supporting unified data management (UDM), storing and retrieving subscription data, and supporting PCF in storage and retrieval of policy data, etc. In the embodiments of this application, the UDR may also be referred to as a unified data repository network element.

(5) Edge application server discovery function (EASDF): in the embodiments of this application, the EASDF may also be referred to as an edge application server discovery network element, and has the following main functions:

(a) registering to a network repository function (NRF) to perform EASDF discovery and selection; and (b) processing a domain name system (DNS) message according to an indication of the SMF, including:

(b1) receiving a DNS message processing rule from the SMF;

(b2) exchanging the DNS message from the UE;

(b3) forwarding the DNS message to a central DNS (C-DNS) server or a local DNS (L-DNS) server to perform DNS query;

(b4) adding an extension mechanisms for DNS (EDNS) client subnet (ECS) option into the DNS query for a fully qualified domain name (FQDN);

(b5) notifying the SMF of EASDF-related information; and (b6) if using DNS over TLS (DoT, using a TLS protocol to transmit a DNS protocol), DNS over HTTPS (DoH, using an HTTPS protocol to transmit the DNS protocol), or DNS over datagram transport layer security (DTLS, using a DTLS protocol to transmit the DNS protocol), terminating DNS security.

It is to be that the EASDF may be connected to a PDU Session Anchor (PSA) UPF by means of a data plane interface, and may be used for transmitting the DNS message that is exchanged with the UE. In addition, a plurality of EASDF instances may be deployed in a public land mobile network (PLMN), and an interaction between the network function of the 5G core network and the EASDF occurs in one PLMN.

In the 5G network, if a certain terminal device (e.g., any one of the terminal device 200a, the terminal device 200b, the terminal device 200c, and the terminal device 200n) wants to access a data network (DN) outside a mobile communication network, such as Internet, WAP, and Intranet, the terminal device may initiate an access request, the base station may forward, to a core network element UPF in the 5G core network (5G core, which may be referred to as 5GC), a service stream requested by the terminal device and then transmit same to an external data network after performing forwarding by means of the core network element UPF, and the other core network elements in the 5G core network process signaling and control the whole procedure.

In order to obtain more efficient service delivery, edge computing may be used for satisfying different service requirements. It is to be that In an edge computing scene, a plurality of edge application servers (such as the edge application server 100a, the edge application server 100b, and the edge application server 100m in FIG. 1) generally deployed at different stations may provide service for one application, and the plurality of edge application servers bearing the service may use a single IP address or different IP addresses. Generally, the application server of a certain application may be deployed in a central application server, and may also be deployed in the edge application server. If it is wanted to route the service stream of the application to the edge application server, the terminal device needs to know the IP address of the edge application server that provides service for the application. The terminal device may perform discovery to obtain the IP address of an appropriate edge application server (for example, the closest edge application server), so that traffic may be locally routed to the edge application server, and service delay, a traffic routing path, and user service experience may be optimized. On this basis, edge application server discovery is a process in which the terminal device uses a domain name system to search for the IP address of the appropriate edge application server. The domain name system (DNS) is a service of Internet, and as a distributed database in which a domain name is mutually mapped to the IP address, may enable a user to more conveniently access Internet.

The 5G core network supports a PDU connection service between the terminal device and the data network, the PDU connection service is embodied in the form of a protocol data unit (PDU) session, and one PDU session is a process in which one terminal device communicates with the data network. That is to say, after the PDU session is created, a data transmission channel between the terminal device and the data network is also created. By taking the terminal device 200a as an example, if the terminal device 200a wants to obtain certain edge application service, the terminal device 200a may initiate a PDU session creation request to the core network element SMF in the 5G core network, and the core network element SMF may obtain, in the PDU session creation process, the deployment information of the edge application server by means of PDU session-related policy information provided by a core network element PCF, may further select a core network element EASDF according to a related rule, and uses the address of the core network element EASDF as the address of the DNS server of the PDU session and provides the address to the terminal device 200a. Further, the terminal device 200a may transmit a DNS query request message to the core network element EASDF. It is to be that the core network element SMF may configure the DNS message processing rule on the core network element EASDF, so that the core network element EASDF forwards, when detecting the DNS message, the DNS message of the terminal device 200a to a related DNS server, and/or performs reporting when detecting the DNS message. It may be understood that the message processing rule of the DNS message includes information used for DNS message detection and a related operation. The information used for DNS message detection may be a message detection template, and the information used for the related operation may be a message processing operation. It is to be that In the aforementioned PDU session process, the core network element SMF may interact with the core network element EASDF multiple times, so that the core network element EASDF may correctly process a DNS request and a DNS response message, and the core network element SMF may correctly create a transferring path and set a transferring rule, and may further return the IP address of the edge application server to the terminal device 200a; and after receiving the IP address, the terminal device 200a may use the IP address as a service access address to access the edge application server corresponding to the IP address. If the edge application server 100a is finally found by means of the aforementioned process, the edge application server 100a may provide corresponding edge application service to the terminal device 200a.

It may be understood that for an ultra-large bandwidth service, nearby processing ultra-large bandwidth traffic by means of the nearby deployment of mobile edge computing (such as the edge application server shown in FIG. 1) may greatly reduce the impact of a large bandwidth on a backbone network. Typical scenes include, for example, live broadcast of a match in a stadium, live broadcast of a concert, mobile content distribution, etc.

It is to be that the core network element SMF in the embodiments of this application may first generate a node-level message processing rule set, and the message processing rule set may include one or more DNS message processing rules. When the core network element SMF establishes a connection with the core network element EASDF, the core network element SMF may distribute the message processing rule set to the core network element EASDF. It is to be that the transmitting condition of the node-level message processing rule set does not rely on the creation of the PDU session. That is to say, after the core network element EASDF receives the message processing rule set, if rule update is not involved, the received DNS messages all may be processed according to the message processing rule set in subsequent all PDU session processes. That is, the message processing rule set may be used for processing all DNS messages transmitted to the core network element EASDF, and it is not needed that the core network element SMF frequently performs rule distribution.

It may be understood that the aforementioned terminal devices capable of being used for edge computing may include terminal application products in the civil field, the commercial field, the industrial field, etc., such as a smart mobile phone, a tablet computer, a notebook computer, a personal digital assistant, a mobile Internet device (MID), a wearable device (such as a smart watch and a smart bracelet), a smart computer, a smart vehicle-mounted device, smart home, an unmanned aerial vehicle, an ATM, a camera, traffic lights, a power generator, or various types of sensors. The edge application server may be an independent physical sensor, may also be a server cluster or a distributed system composed of a plurality of physical sensors, and may further be a cloud sensor providing basic cloud computing service, such as a cloud database, cloud service, cloud computing, a cloud function, cloud storage, network service, cloud communication, intermediate service, domain name service, security service, CDN, big data, and an artificial smart platform. The terminal device may be directly or indirectly connected to the edge application server in a wired or wireless manner. The embodiments of this application do not limit this herein.

Figure 2A:
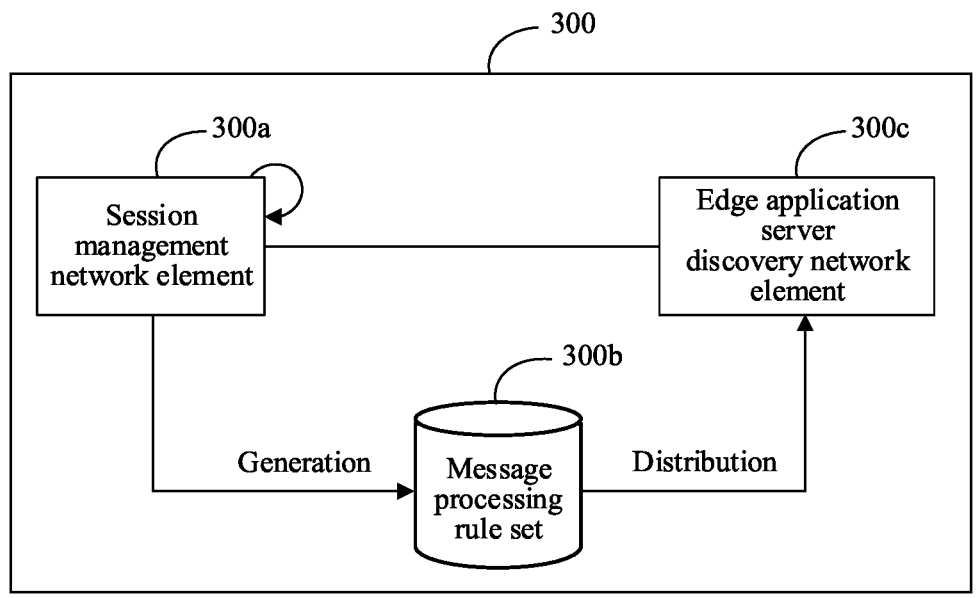
FIG. 2a to FIG. 2b are schematic diagrams of a data processing scene provided by an embodiment of this application.
Figure 2B:
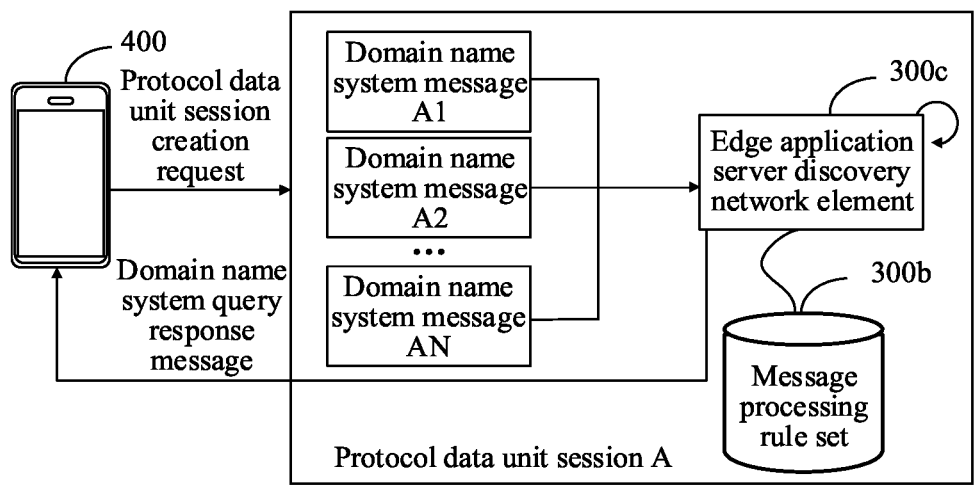

With reference to FIG. 2a to FIG. 2b, FIG. 2a to FIG. 2b are schematic diagrams of a data processing scene provided by an embodiment of this application. The implementation process of the data processing scene is mainly performed in a 5G core network. As shown in FIG. 2a, in a core network 300, a session management network element 300a (i.e., an SMF) may pre-generate one or more message processing rules according to a request of an application function (AF, indicating various service of an application layer) or a configuration of an operator, and the one or more message processing rules may constitute a node-level message processing rule set 300b. The embodiments of this application do not limit the specific number of the message processing rules. When the session management network element 300a establishes a connection with an edge application server discovery network element 300c (i.e., an EASDF), the session management network element and the edge application server discovery network element may perform data exchange, such as performing rule request and distribution. In an optional implementation, the session management network element 300a may distribute the message processing rule set 300b to the edge application server discovery network element 300c.

It is to be that the generation and distribution of the message processing rule may further be performed in other manners. The embodiments of this application do not limit this herein. Reference may be made to subsequent embodiments for some optional manners (such as, a policy control network element generates and distributes the message processing rule). Of course, this application may further expand this to other relevant or similar scenes.

After receiving the message processing rule set 300b, the edge application server discovery network element 300c may process a subsequently received domain name system message (i.e., a DNS system) by using the message processing rule set 300b, and the message processing rule set 300b is suitable for any protocol data unit session of any terminal device. Reference is made to FIG. 2b. The embodiment of this application performs description by using the example that a terminal device initiates a protocol data unit session. As shown in FIG. 2b, if the terminal device 400 initiates, to the core network 300, a protocol data unit session creation request, such as a protocol data unit session A, a plurality of domain name system messages, such as a domain name system message A1, a domain name system message A2, . . . , and a domain name system message AN (N is an integer greater than 1), may be generated in the process of the protocol data unit session A. These domain name system messages may include a query request message type and a query response message type, for example, the domain name system message A1 may be a domain name system query request message transmitted by the terminal device 400. If the message processing rule set 300b includes a plurality of message processing rules, the edge application server discovery network element 300c may respectively obtain, in the plurality of message processing rules included in the message processing rule set 300b, a target message processing rule suitable for each domain name system message, so that the edge application server discovery network element 300c may respectively process each domain name system message according to the corresponding target message processing rule.

By taking the domain name system message A1 as an example, if the message processing rule set 300b includes M message processing rules, i.e., a message processing rule X1, a message processing rule X2, . . . , and a message processing rule XM, and M is an integer greater than 1, then when receiving the domain name system message A1, the edge application server discovery network element 300c may match the domain name system message A1 with the M message processing rules in the message processing rule set 300b, and determines a matched message processing rule as a candidate message processing rule corresponding to the domain name system message A1. In this case, if there is one candidate message processing rule, the candidate message processing rule may be directly determined as the target message processing rule corresponding to the domain name system message A1. In this case, if there are a plurality of candidate message processing rules, the target message processing rule corresponding to the domain name system message A1 may be obtained from the candidate message processing rules. For example, in this case, if the candidate message processing rules include the message processing rule X1 and the message processing rule X2, then the edge application server discovery network element 300c may perform sorting according to rule priorities corresponding to the message processing rule X1 and the message processing rule X2, and selects, from the two message processing rules, the message processing rule having the highest rule priority as the target message processing rule corresponding to the domain name system message A1. It is to be that the target message processing rule may further be determined from the plurality of candidate message processing rules in other manners, and the embodiments of this application do not limit this herein. If the target message processing rule determined through the aforementioned step is the message processing rule X1, the edge application server discovery network element 300c may process the domain name system message A1 according to a message processing operation in the message processing rule X1. It may be understood that the process of processing other received domain name system messages (such as the domain name system message A2 and the domain name system message AN) by the edge application server discovery network element 300c is consistent with the process of processing the domain name system message A1, and details are not described herein again.

As shown in FIG. 2b, finally, the edge application server discovery network element 300c may transmit a domain name system query response message to the terminal device 400. In one implementation, the domain name system query response message may include the IP addresses of one or more edge application servers. It may be understood that for other protocol data unit sessions created by the terminal device 400, or the protocol data unit sessions created by other terminal devices, the processing process thereof is consistent with the processing process of the protocol data unit session A, and details are not described herein again.

It is to be that the data processing scene shown in FIG. 2a to FIG. 2b only embodies the core network elements (including the SMF and the EASDF) closely associated with the embodiment of this application. The actual service scenes also relate to other core network elements, such as an access and mobility management function (AMF), a base station, and a UDM, and details are not described in the embodiment of this application.

It may be known from the aforementioned content that the message processing rule set provided by the embodiment of this application is at a node level, and the transmitting condition of the message processing rule set does not rely on the creation of the protocol data unit session. That is to say, after the session management network element successfully distributes the message processing rule set to the edge application server discovery network element, if rule update is not involved, then no matter how many protocol data unit sessions are subsequently created, it is not needed to trigger the request and distribution of the message processing rule again. That is, the session management network element does not need to frequently distribute the message processing rule for each protocol data unit session of each terminal device. In addition, the edge application server discovery network element may directly perform, in response to receiving the domain name system message, related processing on the domain name system message according to the received message processing rule set, so that the processing efficiency of the domain name system message may be improved.

Figure 3:
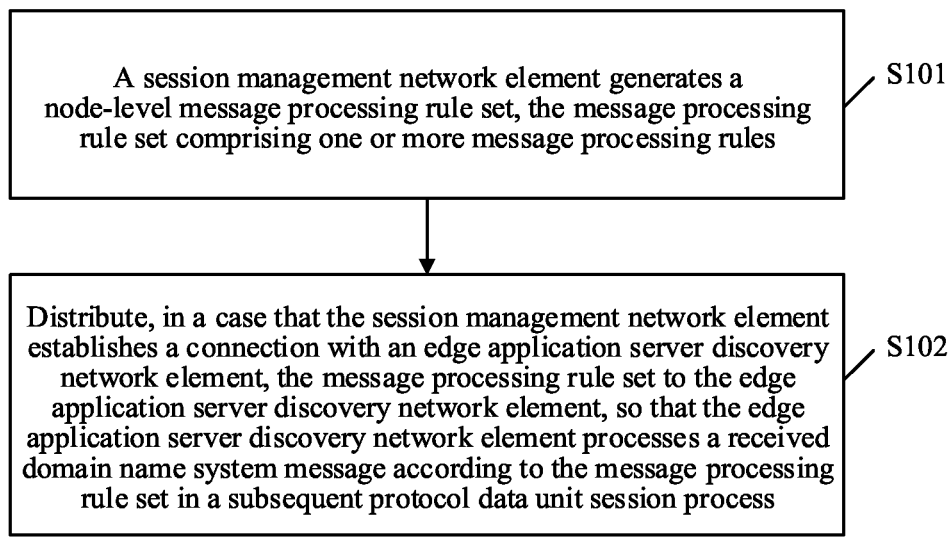
FIG. 3 is a schematic flowchart of a data processing method provided by an embodiment of this application.

With reference to FIG. 3, FIG. 3 is a schematic flowchart of a data processing method provided by an embodiment of this application. The data processing method may be executed by a session management network element (SMF). As shown in FIG. 3, the data processing method at least may include the following steps S101 to S102.

S101, the session management network element generates a node-level message processing rule set, where the message processing rule set includes one or more message processing rules.

The session management network element may obtain rule generation information, may further generate one or more message processing rules (DNS message handling rule) according to the rule generation information, and may determine the one or more message processing rules as the message processing rule set. The rule generation information may include, for example, the request information of an application function (AF) or the configuration information of an operator. It is to be that the message processing rule set in the embodiment of this application is at a node level. That is, the transmitting condition of the message processing rule set does not rely on the creation of a protocol data unit session, and the message processing rule set may be transmitted when a network element is enabled.

Each message processing rule in message processing rule set includes a message detection template and a message processing operation. The message detection template may specifically include one or more of a query request message detection template and a query response message detection template; the message processing operation includes, but not limited to, one or more of a content reporting operation, a forwarding operation, a buffer waiting operation, and a transmitting operation; and the forwarding operation may further include an option creation operation or an address replacement operation. In addition, each message processing rule may further include a rule identifier and a rule priority, and may also further at least one of: a rule level and a life cycle. The rule identifier is an identifier for distinguishing and marking each message processing rule. The rule priority may represent an order in which each message processing rule is executed. The rule level is the node level. The life cycle may represent a valid time range of each message processing rule.

More specifically, each message processing rule may include the following content.

(1) Rule identifier (rule ID).
(2) Rule level: node level, i.e., the message processing rule is valid for all domain name system messages (i.e., DNS messages) on a node.
(3) Rule priority (precedence of the DNS message handling rule).
(4) Message detection template (DNS message detection template), including at least one of the following content:
(a) if the message type of the domain name system message is a query request message type (i.e., the DNS message type is DNS query):
including an array that represents a fully qualified domain name (FQDN) range, where the array may include one or more fully qualified domain names, and the one or more fully qualified domain names in the array may be used for performing matching on the domain name system message, i.e., serving as the query request message detection template; and (b) if the message type of the domain name system message is a query response message type (i.e., the DNS message type is DNS response):

at least one of the following arrays may be included: an array that represents the fully qualified domain name range, and an array that represents an edge application server address (i.e., EAS IP address) range (being capable of including one or more edge application server addresses), where one or more fully qualified domain names or one or more edge application server addresses in the array may be used for performing matching on the domain name system message, i.e., serving as the query response message detection template.

(5) Message processing operation, being capable of including:

(a) content reporting operation: reporting the content of the domain name system message to the session management network element, where for example, the content may include at least one of an edge application server IP address, an FQDN and the like resolved from the domain name system message;

(b) forwarding operation: transmitting the domain name system message to a pre-configured DNS server/resolver or an indicated DNS server, where in addition, the following operations may also be included (the indicated DNS server is included in the message processing rule):

(b1) option creation operation: information of creating an optional ECS option is included in the domain name system message (the information of creating the ECS option by an edge application server discovery network element is included in the message processing rule); and (b2) address replacement operation: replacing a destination address of the domain name system message with an indicated DNS server address, and replacing a source address of the domain name system message with a specific IP address, where if the session management network element does not provide the DNS server address, the edge application server discovery network element forwards the domain name system message to a locally pre-configured DNS server/resolver;

(c) buffer waiting operation: buffering the domain name system message, reporting the content of the domain name system message to the session management network element, and waiting for an instruction of the session management network element;

(d) transmitting operation: transmitting a specified domain name system response message to a UE.

(6) Life cycle, which may also be referred to as a time window: defining a valid time of the message processing rule. The message processing rule is invalid outside the time window.

It may be known from the aforementioned content that the query request message detection template provided by the embodiment of this application does not include a source IP address (such as an IP address of a terminal device) because a solution provided by this application does not relate to session-level rule configuration, but is suitable for all protocol data unit sessions.

It may be understood that the specific content of the message processing rule may be adjusted according to actual requirements, and the embodiment of this application does not limit this.

S102, when establishing a connection with the edge application server discovery network element, the session management network element distributes the message processing rule set to the edge application server discovery network element, so that the edge application server discovery network element processes a received domain name system message according to the message processing rule set in a subsequent protocol data unit session process.

When the session management network element establishes a (node-level) connection with the edge application server discovery network element (EASDF), the session management network element may distribute the generated message processing rule set to the edge application server discovery network element. In the subsequent protocol data unit session (PDU session) process, when receiving the domain name system message, the edge application server discovery network element may perform detection and execute an operation according to a node-level message processing rule in the aforementioned message processing rule set. That is to say, in the embodiment of this application, when the message processing rule set is configured on the edge application server discovery network element, the message processing rule set is suitable for all protocol data unit sessions of all terminal devices, and it is not needed that every when the protocol data unit session is created, the session management network element is required to perform interaction of the message processing rule with the edge application server discovery network element, that is, the session management network element does not need to frequently distribute the message processing rule to the edge application server discovery network element for each protocol data unit session of each terminal device.

It may be understood that the session management network element may also store the generated message processing rule set to a unified data repository network element (UDR). Thus, when the session management network element establishes the connection with the edge application server discovery network element, the message processing rule set may be distributed by the unified data repository network element to the session management network element, and then is forwarded by the session management network element to the edge application server discovery network element.

In this way, when required, the message processing rule may be distributed to the session management network element, so that the storage pressure of the session management network element is reduced, and the performance of the session management network element is improved.

In addition, the session management network element may also obtain rule update information, may further perform rule update on the message processing rule set according to the rule update information, and transmits an updated message processing rule set to the unified data repository network element and the edge application server discovery network element, so that the edge application server discovery network element may process a subsequently received domain name system message according to the updated message processing rule set.

By updating the message processing rule set in a timely manner, it may be ensured that accurate processing is performed on the received domain name system message.

The rule update information may be obtained according to the request of the application function or the configuration of the operator. Rule update may be performed in a full update manner, i.e., a full message processing rule set is distributed, including an updated rule and an unchanged rule. Rule update may also be performed in an incremental update manner, i.e., updated content is only distributed, but the content that is not updated does not need to be repeatedly distributed, and thus, the update efficiency is improved. The updated content may include modification or deletion of the content of one or more specific message processing rules, or addition of one or more new message processing rules in the message processing rule set, or deletion of one or more existing message processing rules.

Figure 4:
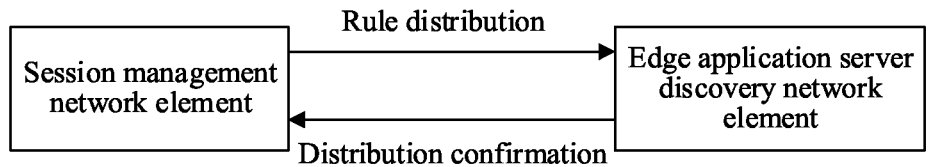
FIG. 4 is a schematic diagram of a data processing scene provided by an embodiment of this application.

With reference to FIG. 4, FIG. 4 is a schematic diagram of a data processing scene provided by an embodiment of this application. As shown in FIG. 4, a node-level message processing rule set is generated by a session management network element. When the session management network element establishes a connection with an edge application server discovery network element, the session management network element distributes the generated node-level message processing rule set to the edge application server discovery network element, and after receiving the message processing rule set, the edge application server discovery network element may transmit, to the session management network element, a response message for reception confirmation (i.e., distribution confirmation). It is to be that A rule distribution procedure may be defined as the service of the edge application server discovery network element, or may be defined as the service of the session management network element, and the embodiment of this application does not limit the definition of the specific service implementing the function.

It is to be that when simultaneously generating a session-level message processing rule and a node-level message processing rule, the session management network element may continue to distribute the session-level message processing rule during creation of a protocol data unit session. When receiving the session-level message processing rule, the edge application server discovery network element may preferentially execute the session-level message processing rule and then executes the node-level message processing rule provided by the embodiment of this application. When the session-level message processing rule is not received, the edge application server discovery network element executes the node-level message processing rule. For example, for the node-level message processing rule configured on the edge application server discovery network element, it is hoped that there are some special processing scenes for certain protocol data unit sessions, the session management network element distributes the session-level message processing rule to the edge application server discovery network element, and in this case, the edge application server discovery network element may select to preferentially execute the session-node message processing rule.

The embodiment of this application may support that the session management network element generates the node-level message processing rule set, and may further distribute, when the session management network element establishes the connection with the edge application server discovery network element, the message processing rule set to the edge application server discovery network element, and after receiving the message processing rule set, the edge application server discovery network element may process the received domain name system message according to the message processing rule set in the subsequent protocol data unit session process. Hence, the transmitting condition of the node-level message processing rule provided by the embodiment of this application does not rely on the creation of the protocol data unit session. That is to say, after the session management network element successfully distributes the message processing rule set to the edge application server discovery network element, if rule update is not involved, then no matter how many protocol data unit sessions are subsequently created, it is not needed to trigger the request and distribution of the message processing rule again. That is, the session management network element does not need to frequently distribute the message processing rule for each protocol data unit session of each terminal device, and thus, the amount of interaction between the session management network element and the edge application server discovery network element may be greatly reduced. In addition, when receiving the domain name system message, the edge application server discovery network element may directly perform related processing on the domain name system message according to the received message processing rule set, and thus, the processing efficiency of the domain name system message may be improved.

Figure 5:
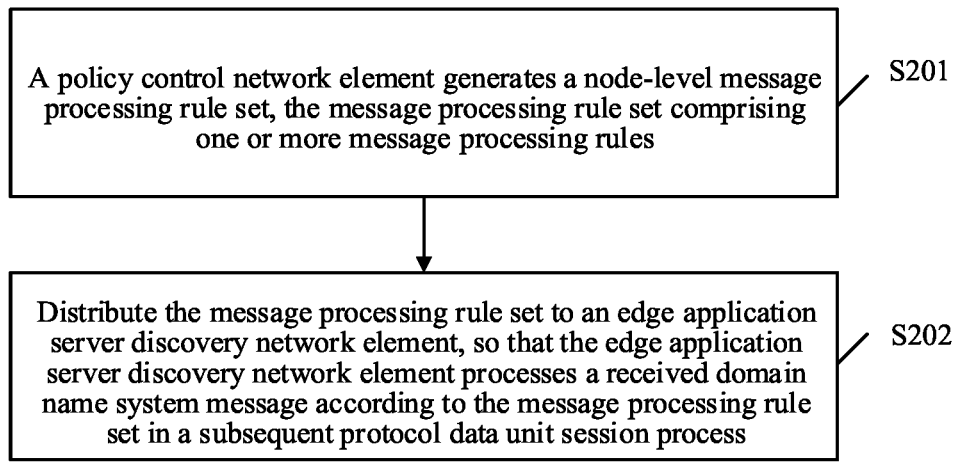
FIG. 5 is a schematic flowchart of another data processing method provided by an embodiment of this application.

With reference to FIG. 5, FIG. 5 is a schematic flowchart of another data processing method provided by an embodiment of this application. The data processing method may be executed by a policy control network element (PCF). As shown in FIG. 5, the data processing method at least may include the following steps S201 to S202.

S201, the policy control network element generates a node-level message processing rule set, where the message processing rule set includes one or more message processing rules.

The policy control network element may obtain rule generation information, may further generate, according to the rule generation information, one or more message processing rules having priorities, and may determine the one or more message processing rules as the message processing rule set. The rule generation information may specifically include the request information of an application function or the configuration information of an operator. It is to be that the message processing rule set in the embodiment of this application is at a node level That is, the transmitting condition of the message processing rule set does not rely on the creation of a protocol data unit session, and the message processing rule set may be transmitted when a network element is enabled.

In this embodiment, Reference may be made to description in S101 in the embodiment corresponding to FIG. 3 for the rule content of the message processing rule, and details are not described herein again. It may be understood that the specific content of the message processing rule may be adjusted according to actual requirements, and the embodiment of this application does not limit this.

S202, distribute the message processing rule set to an edge application server discovery network element, so that the edge application server discovery network element processes a received domain name system message according to the message processing rule set in a subsequent protocol data unit session process.

The policy control network element may distribute a generated message processing rule set to the edge application server discovery network element, and in the subsequent protocol data unit session (PDU session) process, when receiving the domain name system message, the edge application server discovery network element may perform detection and execute an operation according to a node-level message processing rule in the aforementioned message processing rule set. Therefore, in the embodiment of this application, when configured on the edge application server discovery network element, the message processing rule set is suitable for all protocol data unit sessions of all terminal devices, and it is not needed to perform interaction of the message processing rule every when the protocol data unit session is created. That is, the policy control network element does not need to frequently distribute the message processing rule for each protocol data unit session of each terminal device.

The policy control network element may distribute the message processing rule set to the edge application server discovery network element in a plurality of different manners.

Figure 6:
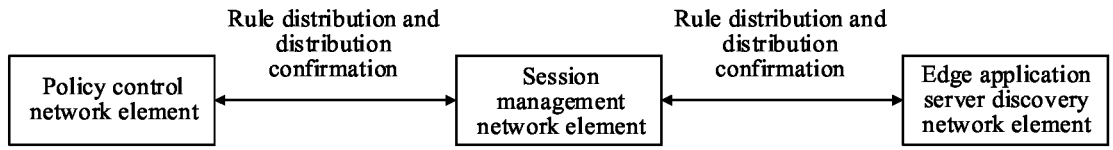
FIG. 6 is a schematic diagram of another data processing scene provided by an embodiment of this application.

In one possible implementation, when a session management network element establishes a connection with the edge application server discovery network element, the policy control network element may forward, in response to a rule obtaining request transmitted by the session management network element, the message processing rule set to the edge application server discovery network element by means of the session management network element. With reference to FIG. 6, FIG. 6 is a schematic diagram of another data processing scene provided by an embodiment of this application. As shown in FIG. 6, a node-level message processing rule set is generated by a policy control network element. When a session management network element establishes a connection with an edge application server discovery network element, the session management network element may request the node-level message processing rule set from the policy control network element; the policy control network element may transmit, in response to a rule obtaining request, the message processing rule set in a related response message to the session management network element (rule distribution); and after receiving the message processing rule set, the session management network element may transmit, to the policy control network element, a response message for reception confirmation (i.e., distribution confirmation). Next, the session management network element may distribute the message processing rule set to the edge application server discovery network element (i.e., rule distribution), and after receiving the message processing rule set, the edge application server discovery network element may transmit, to the session management network element, a response message for reception confirmation (i.e., distribution confirmation).

Figure 7:
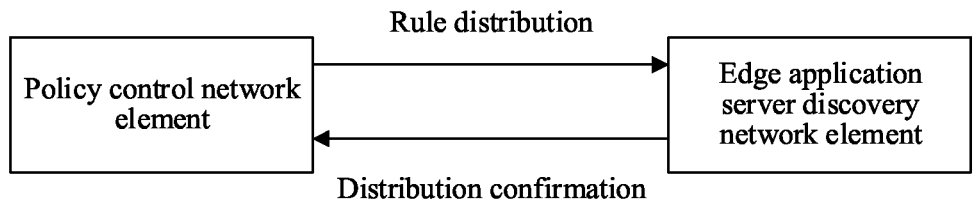
FIG. 7 is a schematic diagram of another data processing scene provided by an embodiment of this application.

In one possible implementation, the policy control network element may distribute, in response to a rule obtaining request transmitted by the edge application server discovery network element, the message processing rule set to the edge application server discovery network element. With reference to FIG. 7, FIG. 7 is a schematic diagram of another data processing scene provided by an embodiment of this application. As shown in FIG. 7, a node-level message processing rule set is generated by a policy control network element. When enabled, an edge application server discovery network element may actively request the node-level message processing rule set from the policy control network element; the policy control network element may transmit, in response to a rule obtaining request, the message processing rule set in a related response message to the edge application server discovery network element (i.e., rule distribution); and after receiving the message processing rule set, the edge application server discovery network element may transmit, to the policy control network element, a response message for reception confirmation (i.e., distribution confirmation).

Figure 8:
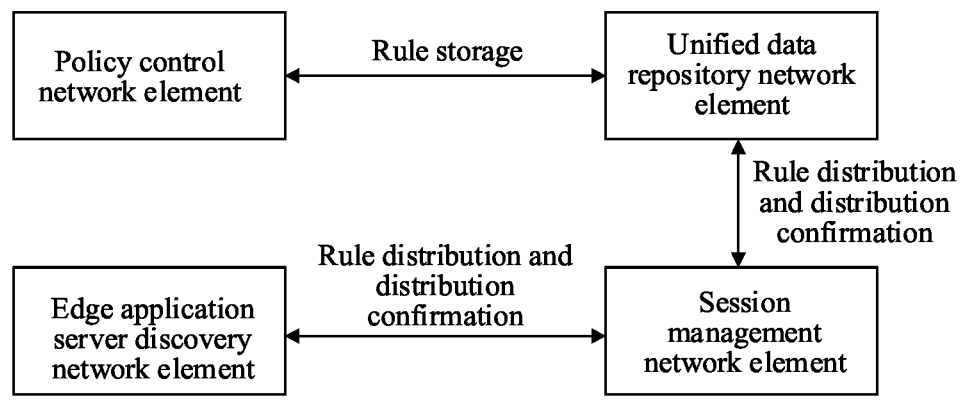
FIG. 8 is a schematic diagram of another data processing scene provided by an embodiment of this application.

In one possible implementation, the policy control network element may store the message processing rule set to a unified data repository network element (UDR), so that the unified data repository network element distributes, when a session management network element establishes a connection with the edge application server discovery network element, the message processing rule set to the session management network element, where the session management network element is a network element for forwarding the message processing rule set to the edge application server discovery network element. With reference to FIG. 8, FIG. 8 is a schematic diagram of another data processing scene provided by an embodiment of this application. As shown in FIG. 8, a node-level message processing rule set is generated by a policy control network element. The policy control network element may first store the node-level message processing rule set to a unified data repository network element (i.e., rule storage); when a session management network element establishes a connection with an edge application server discovery network element, the unified data repository network element may distribute the message processing rule set to the session management network element (i.e., rule distribution); and after receiving the message processing rule set, the session management network element may transmit, to the unified data repository network element, a response message for reception configuration (i.e., distribution confirmation). Next, the session management network element may distribute the message processing rule set to the edge application server discovery network element (i.e., rule distribution), and after receiving the message processing rule set, the edge application server discovery network element may transmit, to the session management network element, a response message for reception confirmation (i.e., distribution confirmation).

In addition, the embodiment of this application further supports that the policy control network element performs rule update on the message processing rule set, and the distribution paths of different message processing rule sets are respectively described below.

In one possible implementation, the policy control network element may obtain rule update information, may further perform rule update on the message processing rule set according to the rule update information, and transmits an updated message processing rule set to the session management network element, so that the session management network element may transmit the updated message processing rule set to the edge application server discovery network element. Reference may be made to related description in the embodiment corresponding to FIG. 6 for a specific process.

In one possible implementation, the policy control network element may obtain the rule update information, may further perform rule update on the message processing rule set according to the rule update information, and transmits the updated message processing rule set to the edge application server discovery network element. Reference may be made to related description in the embodiment corresponding to FIG. 7 for a specific process.

In one possible implementation, the policy control network element may obtain the rule update information, may further perform rule update on the message processing rule set according to the rule update information, and stores the updated message processing rule set to the unified data repository network element, so that the unified data repository network element may distribute the updated message processing rule set to the session management network element, where the session management network element is a network element for forwarding the updated message processing rule set to the edge application server discovery network element. Reference may be made to related description in the embodiment corresponding to FIG. 8 for a specific process.

It may be understood that after successful reception, the edge application server discovery network element may further process a subsequently received domain name system message according to the updated message processing rule set.

The aforementioned rule update information may be obtained according to the request of an application function or the configuration of an operator. Reference may be made to the description of the embodiment corresponding to FIG. 3 for a rule update manner, and details are not described herein again.

The embodiment of this application may support that the policy control network element generates the node-level message processing rule set, and may further distribute the message processing rule set to the edge application server discovery network element, and after receiving the message processing rule set, the edge application server discovery network element may process the received domain name system message according to the message processing rule set in a subsequent protocol data unit session process. Hence, the transmitting condition of the node-level message processing rule set provided by the embodiment of this application does not rely on the creation of a protocol data unit session. That is to say, after the policy control network element successfully distributes the message processing rule set to the edge application server discovery network element, if rule update is not involved, then no matter how many protocol data unit sessions are subsequently created, it is not needed to trigger the request and distribution of the message processing rule again. That is, it is not needed to frequently distribute the message processing rule for each protocol data unit session of each terminal device. In addition, the edge application server discovery network element may directly perform, in response to receiving the domain name system message, related processing on the domain name system message according to the received message processing rule set, and thus, the processing efficiency of the domain name system message may be improved.

Figure 9:
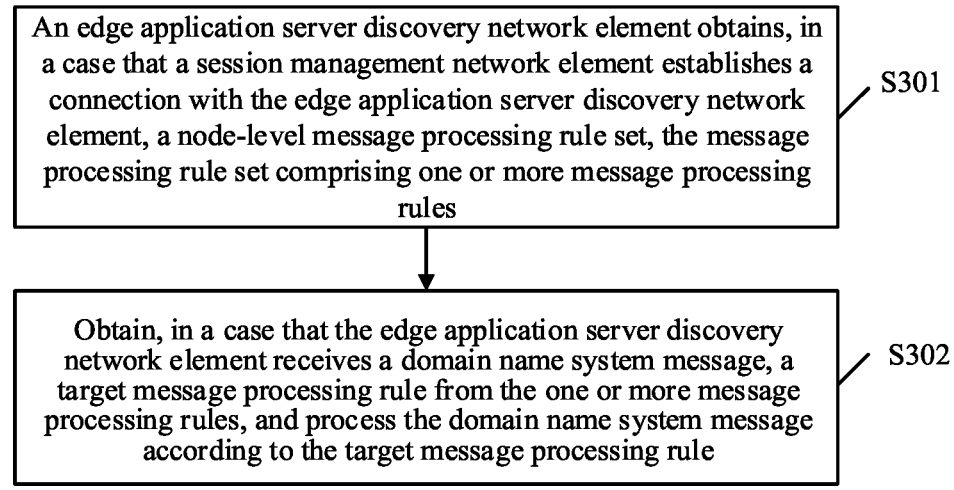
FIG. 9 is a schematic flowchart of another data processing method provided by an embodiment of this application.

With reference to FIG. 9, FIG. 9 is a schematic flowchart of another data processing method provided by an embodiment of this application. The data processing method may be executed by an edge application server discovery network element (EASDF). As shown in FIG. 9, the data processing method at least may include the following steps S301 to S302.

S301, when a session management network element establishes a connection with the edge application server discovery network element, the edge application server discovery network element obtains a node-level message processing rule set, where the message processing rule set includes one or more message processing rules.

When the session management network element establishes the connection with the edge application server discovery network element, the edge application server discovery network element may obtain the node-level message processing rule set, where the transmitting condition of the node-level message processing rule set does not rely on the creation of a protocol data unit session, and the message processing rule set in the embodiment of this application may include one or more message processing rules. With reference to the embodiments corresponding to FIG. 3 and FIG. 5, the message processing rule set may be generated by the session management network element, and may also be generated by a policy control network element, and the embodiment of this application does not limit this.

S302, when receiving a domain name system message, the edge application server discovery network element obtains a target message processing rule from the one or more message processing rules, and processes the domain name system message according to the target message processing rule.

It is to be that Reference may be made to description in S101 in the embodiment corresponding to FIG. 3 for rule content included in each message processing rule in the message processing rule set, and details are not described herein again.

In one possible implementation, if each message processing rule in the message processing rule set includes a rule priority, a life cycle, a message detection template, and a message processing operation, the edge application server discovery network element may obtain, in response to receiving the domain name system message, the target message processing rule from the one or more message processing rules, and may further process the received domain name system message according to the target message processing rule. A specific process may be: the edge application server discovery network element may match, in response to receiving the domain name system message, the domain name system message with the message detection template in the one or more message processing rules, and may determine a matched message processing rule as a candidate message processing rule. According to the definition of the message detection template, a specific process of matching the aforementioned domain name system message with the message detection template in the one or more message processing rules may be: first, the edge application server discovery network element may obtain a message type of the domain name system message, may further obtain, if the message type thereof is a query request message type, a fully qualified domain name (FQDN) in the domain name system message, may further match the fully qualified domain name with a query request message detection template in the one or more message processing rules, and then may determine the message processing rule satisfying a matching condition (such as, matched with the fully qualified domain name) as the candidate message processing rule. In some embodiments, if the message type of the aforementioned domain name system message is a query response message type, the fully qualified domain name in the domain name system message may be obtained, the fully qualified domain name may further be matched with a query response message detection template in the one or more message processing rules, and then the message processing rule satisfying the matching condition (such as, matched with the fully qualified domain name) may be determined as the candidate message processing rule. Alternatively, if the message type is the query response message type, an edge application server address (EAS IP address) in the domain name system message may be obtained, the edge application server address may further be matched with the query response message detection template in the one or more message processing rules, and then the message processing rule satisfying the matching condition (such as, matched with the edge application server address) may be determined as the candidate message processing rule.

After determining the candidate message processing rule, the edge application server discovery network element may obtain the target message processing rule from the candidate message processing rule according to the rule priority corresponding to the candidate message processing rule. It may be understood that there may be one or more candidate message processing rules. In one implementation, when there is one candidate message processing rule, the candidate message processing rule may be determined as the target message processing rule. In one implementation, when there are a plurality of candidate message processing rules, the candidate message processing rule having a highest rule priority in the plurality of candidate message processing rules may be determined as the target message processing rule. In another implementation, when there are a plurality of candidate message processing rules, rule organization and sorting may be performed on the plurality of candidate message processing rules according to rule priories and life cycles respectively corresponding to the plurality of candidate message processing rules. That is to say, the rule priorities and the life cycles may be comprehensively considered, so that the target message processing rule having the highest rule priority may be obtained within a target time period.

Finally, within the life cycle corresponding to the target message processing rule, the edge application server discovery network element may process the aforementioned domain name system message according to the message processing operation in the target message processing rule. It is to be that when a plurality of message processing operations exist in the target message processing rule, the edge application server discovery network element may execute the plurality of message processing operations according to a set order. It may be understood that the life cycle actually relates to a scheduling problem of edge computing. For example, when an edge computing platform is large in load, setting the life cycles of certain message processing rules may cause some beneficial changes, so that subsequent edge application service does not congest on the edge computing platform within the period of time. Reference may be made to the description in the embodiments in FIG. 2a to FIG. 2b for related scenes of the embodiment of this application.

In addition, when the message processing rule set is updated, the edge application server discovery network element may obtain an updated message processing rule set, and then may process a subsequently received domain name system message according to the updated message processing rule set.

The embodiment of this application may support that the edge application server discovery network element obtains, when the session management network element establishes the connection with the edge application server discovery network element, the node-level message processing rule set, may further obtain, in response to receiving the domain name system message, the target message processing rule in the one or more message processing rules, and processes the domain name system message according to the target message processing rule. Hence, the transmitting condition of the node-level message processing rule set provided by the embodiment of this application does not rely on the creation of the protocol data unit session. That is to say, after the edge application server discovery network element successfully obtains the message processing rule set, if rule update is not involved, no matter how many protocol data unit sessions are subsequently created, it is not needed to trigger the request and distribution of the message processing rule again. That is, it is not needed to frequently request the message processing rule for each protocol data unit session of each terminal device. In addition, when receiving the domain name system message, the edge application server discovery network element may directly select an appropriate message processing rule from the received message processing rule set to perform related processing on the domain name system message, and thus, the processing efficiency of the domain name system message may be improved.

Figure 10:
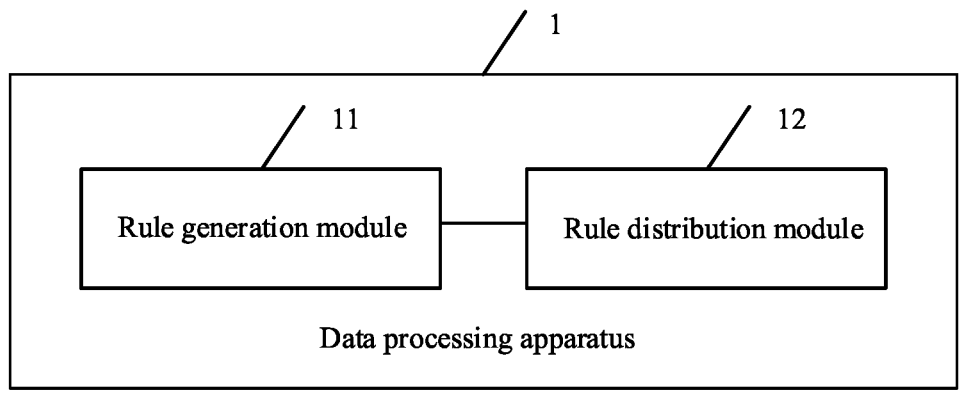
FIG. 10 is a schematic structural diagram of a data processing apparatus provided by an embodiment of this application.

With reference to FIG. 10, FIG. 10 is a schematic structural diagram of a data processing apparatus provided by an embodiment of this application. The data processing apparatus may be a computer program (including a program code) running on a network element device (for example, a session management network element). For example, the data processing apparatus is application software. The apparatus may be configured to execute corresponding steps of a data processing method provided by an embodiment of this application. As shown in FIG. 10, the data processing apparatus 1 may include: a rule generation module 11 and a rule distribution module 12.

The rule generation module 11 is configured to generate a node-level message processing rule set, where the message processing rule set includes one or more message processing rules.

The rule distribution module 12 is configured to distribute, when a session management network element establishes a connection with an edge application server discovery network element, the message processing rule set to the edge application server discovery network element, so that the edge application server discovery network element processes a received domain name system message according to the message processing rule set in a subsequent protocol data unit session process.

In one implementation, each message processing rule in the message processing rule set includes a message detection template and a message processing operation.

In one implementation, the message detection template includes one or more of a query request message detection template and a query response message detection template. The message processing operation includes one or more of a content reporting operation, a forwarding operation, a buffer waiting operation, and a transmitting operation. The forwarding operation includes an option creation operation and an address replacement operation.

In one implementation, the aforementioned each message processing rule further includes a rule priority; and the rule priority represents an order in which each message processing rule is executed.

In one implementation, the aforementioned each message processing rule further includes a rule identifier; and the rule identifier is an identifier for distinguishing and marking each message processing rule.

In one implementation, the aforementioned each message processing rule further includes a life cycle and a rule level; the life cycle represents a valid time range of each message processing rule; and the rule level is a node level.

In one implementation, the data processing apparatus 1 may further include an update module.

The update module is configured to obtain rule update information, and perform rule update on the message processing rule set according to the rule update information.

The rule distribution module 12 is specifically configured to:

distribute an updated message processing rule set to the edge application server discovery network element.

In one implementation, the data processing apparatus 1 may further include a storage module.

The storage module is configured to store the message processing rule set to a unified data repository network element.

The rule distribution module 12 is specifically configured to:

obtain the message processing rule set from the unified data repository network element, and forward the message processing rule set to the edge application server discovery network element.

Reference may be made to S101 in the embodiment corresponding to FIG. 3 for the specific function implementation manner of the rule generation module 11, reference may be made to S102 in the embodiment corresponding to FIG. 3 for the specific function implementation manner of the rule distribution module 12, and details are not described herein again.

The embodiment of this application may support that the session management network element generates the node-level message processing rule set, and may further distribute, when the session management network element establishes the connection with the edge application server discovery network element, the message processing rule set to the edge application server discovery network element, and after receiving the message processing rule set, the edge application server discovery network element may process the received domain name system message according to the message processing rule set in the subsequent protocol data unit session process. Hence, the transmitting condition of the node-level message processing rule set provided by the embodiment of this application does not rely on the creation of the protocol data unit session. That is to say, after the session management network element successfully distributes the message processing rule set to the edge application server discovery network element, if rule update is not involved, then no matter how many protocol data unit sessions are subsequently created, it is not needed to trigger the request and distribution of the message processing rule again. That is, the session management network element does not need to frequently distribute the message processing rule for each protocol data unit session of each terminal device, and thus, the amount of interaction between the session management network element and the edge application server discovery network element may be greatly reduced. In addition, when receiving the domain name system message, the edge application server discovery network element may directly perform related processing on the domain name system message according to the received message processing rule set, and thus, the processing efficiency of the domain name system message may be improved.

Figure 11:
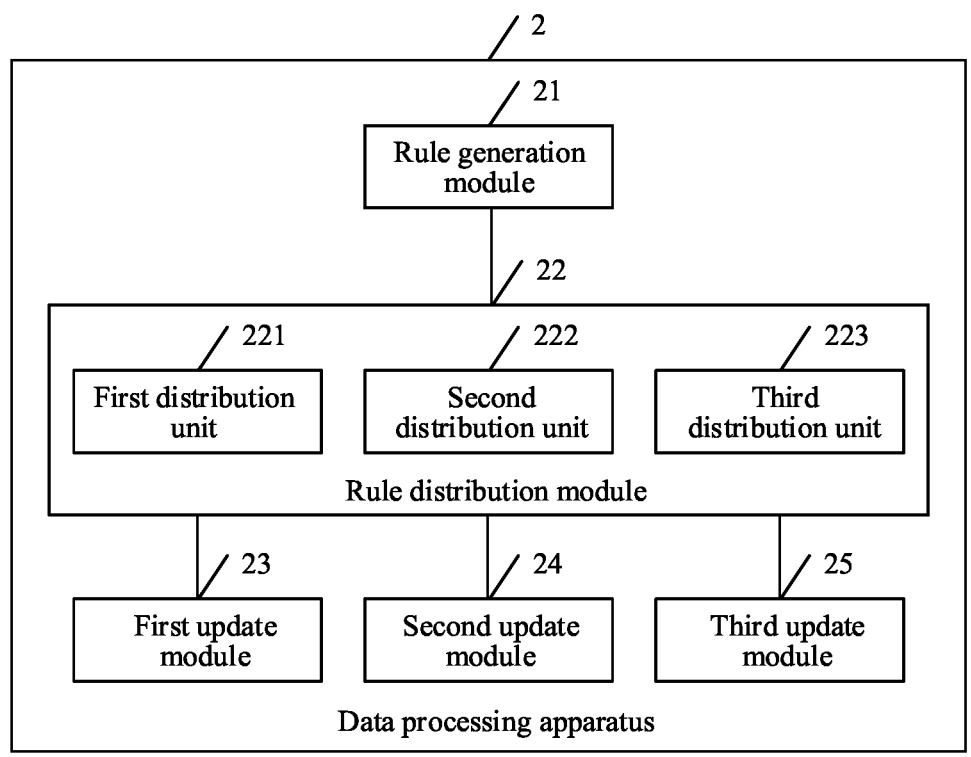
FIG. 11 is a schematic structural diagram of another data processing apparatus provided by an embodiment of this application.

With reference to FIG. 11, FIG. 11 is a schematic structural diagram of another data processing apparatus provided by an embodiment of this application. The data processing apparatus may be a computer program (including a program code) running on a network element device (for example, a policy control network element). For example, the data processing apparatus is application software. The data processing apparatus may be configured to execute corresponding steps of a data processing method provided by an embodiment of this application. As shown in FIG. 11, the data processing apparatus 2 may include: a rule generation module 21 and a rule distribution module 22.

The rule generation module 21 is configured to generate a node-level message processing rule set, where the message processing rule set includes one or more message processing rules.

The rule distribution module 22 is configured to distribute the message processing rule set to an edge application server discovery network element, so that the edge application server discovery network element processes a received domain name system message according to the message processing rule set in a subsequent protocol data unit session process.

Reference may be made to S201 in the embodiment corresponding to FIG. 5 for the specific function implementation manner of the rule generation module 21, reference may be made to S202 in the embodiment corresponding to FIG. 5 for the specific function implementation manner of the rule distribution module 22, and details are not described herein again.

With reference to FIG. 11, the aforementioned rule distribution module 22 may include: a first distribution unit 221, a second distribution unit 222, and a third distribution unit 223.

The first distribution unit 221 is configured to forward, in response to a rule obtaining request transmitted by a session management network element when the session management network element establishes a connection with an edge application server discovery network element, the message processing rule set to the edge application server discovery network element by means of the session management network element.

The second distribution unit 222 is configured to distribute, in response to a rule obtaining request transmitted by the edge application server discovery network element, the message processing rule set to the edge application server discovery network element.

The third distribution unit 223 is configured to store the message processing rule set to a unified data repository network element, so that the unified data repository network element distributes, when the session management network element establishes the connection with the edge application server discovery network element, the message processing rule set to the session management network element, where the session management network element is a network element for forwarding the message processing rule set to the edge application server discovery network element.

Reference may be made to S202 in the embodiment corresponding to FIG. 5 for the specific function implementation manners of the first distribution unit 221, the second distribution unit 222, and the third distribution unit 223, and details are not described herein again.

With reference to FIG. 11, a network element apparatus 2 may further include: a first update module 23, a second update module 24, and a third update module 25.

The first update module 23 is configured to obtain rule update information, and perform rule update on the message processing rule set according to the rule update information.

The first distribution unit 221 is specifically configured to transmit an updated message processing rule set to the session management network element, so that the session management network element transmits the updated message processing rule set to the edge application server discovery network element.

The second update module 24 is configured to obtain the rule update information, and perform rule update on the message processing rule set according to the rule update information.

The second distribution unit 222 is specifically configured to transmit the updated message processing rule set to the edge application server discovery network element.

The third update module 25 is configured to obtain the rule update information, and perform rule update on the message processing rule set according to the rule update information.

The third distribution unit 223 is specifically configured to store the updated message processing rule set to the unified data repository network element, so that the unified data repository network element distributes the updated message processing rule set to the session management network element, where the session management network element is a network element for forwarding the updated message processing rule set to the edge application server discovery network element.

Reference may be made to S202 in the embodiment corresponding to FIG. 5 for the specific function implementation manners of the first update module 23, the second update module 24, and the third update module 25, and details are not described herein again.

The embodiment of this application may support that the policy control network element generates the node-level message processing rule set, and may further distribute the message processing rule set to the edge application server discovery network element, and after receiving the message processing rule set, the edge application server discovery network element may process the received domain name system message according to the message processing rule set in the subsequent protocol data unit session process. Hence, the transmitting condition of the node-level message processing rule set provided by the embodiment of this application does not rely on the creation of a protocol data unit session. That is to say, after the policy control network element successfully distributes the message processing rule set to the edge application server discovery network element, if rule update is not involved, then no matter how many protocol data unit sessions are subsequently created, it is not needed to trigger the request and distribution of the message processing rule again. That is, it is not needed to frequently distribute the message processing rule for each protocol data unit session of each terminal device. In addition, the edge application server discovery network element may directly perform, in response to receiving the domain name system message, related processing on the domain name system message according to the received message processing rule set, and thus, the processing efficiency of the domain name system message may be improved.

Figure 12:
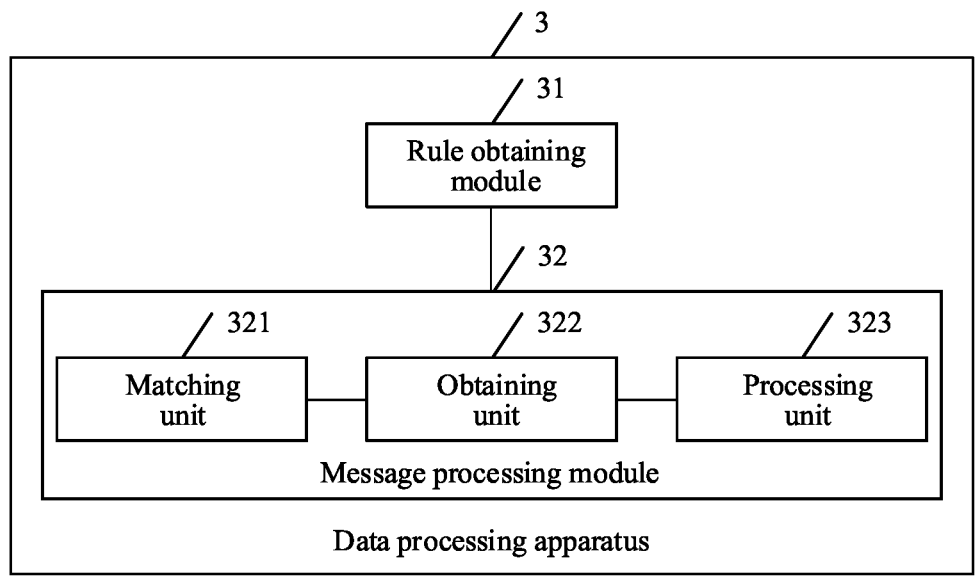
FIG. 12 is a schematic structural diagram of another data processing apparatus provided by an embodiment of this application.

With reference to FIG. 12, FIG. 12 is a schematic structural diagram of another data processing apparatus provided by an embodiment of this application. The data processing apparatus may be a computer program (including a program code) running on a network element device (for example, an edge application server discovery network element). For example, the data processing apparatus is application software. The apparatus may be configured to execute corresponding steps of a data processing method provided by an embodiment of this application. As shown in FIG. 12, the data processing apparatus 3 may include: a rule obtaining module 31 and a message processing module 32.

The rule obtaining module 31 is configured to obtain a node-level message processing rule set when a session management network element establishes a connection with the edge application server discovery network element, where the message processing rule set includes one or more message processing rules.

The message processing module 32 is configured to obtain, when the edge application server discovery network element receives a domain name system message, a target message processing rule in the one or more message processing rules, and process the domain name system message according to the target message processing rule.

Reference may be made to S301 in the embodiment corresponding to FIG. 9 for the specific function implementation manner of the rule obtaining module 31, reference may be made to S302 in the embodiment corresponding to FIG. 9 for the specific function implementation manner of the message processing module 32, and details are not described herein again.

In one possible implementation, each message processing rule in the aforementioned message processing rule set includes a rule priority, a life cycle, a message detection template, and a message processing operation.

With reference to FIG. 12, the aforementioned message processing module 32 may include: a matching unit 321, an obtaining unit 322, and a processing unit 323.

The matching unit 321 is configured to match, when the edge application server discovery network element receives the domain name system message, the domain name system message with the message detection template in the one or more message processing rules, and determine a matched message processing rule as a candidate message processing rule.

In one implementation, the aforementioned message detection template includes one or more of a query request message detection template and a query response message detection template.

The aforementioned matching unit 321 is specifically configured to obtain a message type of the domain name system message; and if the message type is a query request message type, obtain a fully qualified domain name in the domain name system message, match the fully qualified domain name with the query request message detection template in the one or more message processing rules, and determine the message processing rule satisfying a matching condition as a candidate message processing rule; and is specifically configured to obtain, if the message type is a query response message type, the fully qualified domain name in the domain name system message, match the fully qualified domain name with the query response message detection template in the one or more message processing rules, and determine the message processing rule satisfying the matching condition as the candidate message processing rule; or if the message type is the query response message type, obtain an edge application server protocol address in the domain name system message, match the edge application server protocol address with the query response message detection template in the one or more message processing rules, and determine the message processing rule satisfying the matching condition as the candidate message processing rule.

The obtaining unit 322 is configured to obtain the target message processing rule from the candidate message processing rule according to the rule priority corresponding to the candidate message processing rule.

The processing unit 323 is configured to process the domain name system message according to the message processing operation in the target message processing rule within the life cycle corresponding to the target message processing rule.

Reference may be made to step S302 in the embodiment corresponding to FIG. 9 for the specific function implementation manners of the matching unit 321, the obtaining unit 322, and the processing unit 323, and details are not described herein again.

The embodiment of this application may support that the edge application server discovery network element obtains, when the session management network element establishes the connection with the edge application server discovery network element, the node-level message processing rule set, may further obtain, in response to receiving the domain name system message, the target message processing rule in the one or more message processing rules, and processes the domain name system message according to the target message processing rule. Hence, the transmitting condition of the node-level message processing rule set provided by the embodiment of this application does not rely on the creation of the protocol data unit session. That is to say, after the edge application server discovery network element successfully obtains the message processing rule set, if rule update is not involved, no matter how many protocol data unit sessions are subsequently created, it is not needed to trigger the request and distribution of the message processing rule again. That is, it is not needed to frequently request the message processing rule for each protocol data unit session of each terminal device. In addition, when receiving the domain name system message, the edge application server discovery network element may directly select an appropriate message processing rule from the received message processing rule set to perform related processing on the domain name system message, and thus, the processing efficiency of the domain name system message may be improved.

Figure 13:
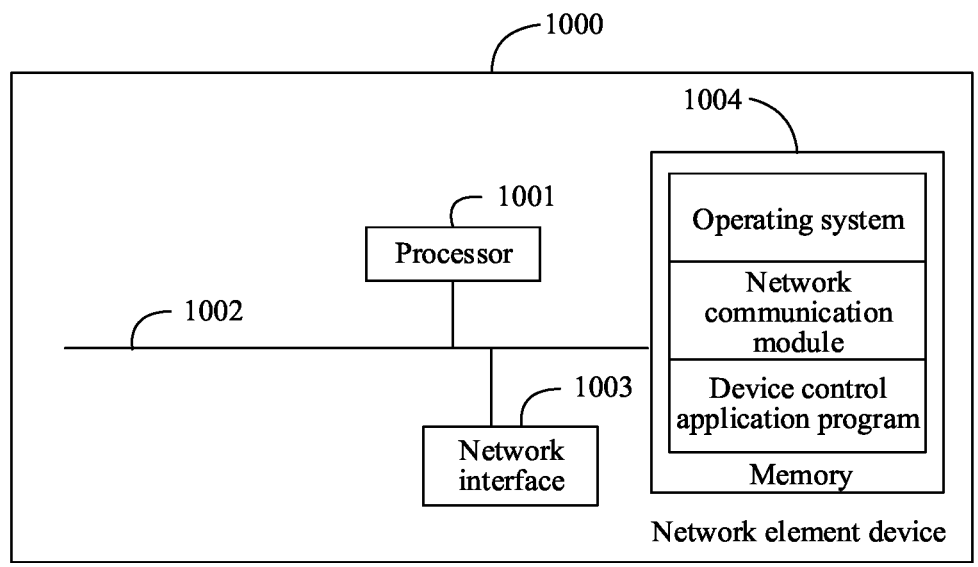
FIG. 13 is a schematic structural diagram of a network element device provided by an embodiment of this application.

With reference to FIG. 13, FIG. 13 is a schematic structural diagram of a network element device provided by an embodiment of this application. As shown in FIG. 13, the network element device 1000 may include: a processor 1001, a network interface 1003, and a memory 1004. In addition, the aforementioned network element device 1000 may further include: at least one communication bus 1002. The communication bus 1002 is configured to implement connection and communication between these components. In some embodiments, the network interface 1003 may include a standard wired interface and a standard wireless interface (such as a Wi-Fi interface). The memory 1004 may be a high-speed RAM memory, and may also be a non-volatile memory, for example, at least one magnetic disk memory. In some embodiments, the memory 1004 may further be at least one storage apparatus far away from the aforementioned processor 1001. As shown in FIG. 13, the memory 1004 used as a computer-readable storage medium may include an operating system, a network communication module, and a device control application program. In the embodiment of this application, the network element device 1000 may be a session management network element.

In the network element device 1000 shown in FIG. 13, the network interface 1003 may provide a network communication network element. The processor 1001 may be configured to invoke the device control application program stored in the memory 1004, to cause the network element device 1000 to:
 generate a node-level message processing rule set, where the message processing rule set includes one or more message processing rules; and
 distribute, when establishing a connection with an edge application server discovery network element, the message processing rule set to the edge application server discovery network element, so that the edge application server discovery network element processes a received domain name system message according to the message processing rule set in a subsequent protocol data unit session process.

It is to be understood that the network element device 1000 described in the embodiment of this application may implement the description of a data processing method in the embodiment corresponding to FIG. 3, and details are not described herein again. In addition, the beneficial effects of the same method are not described herein again.

Figure 14:
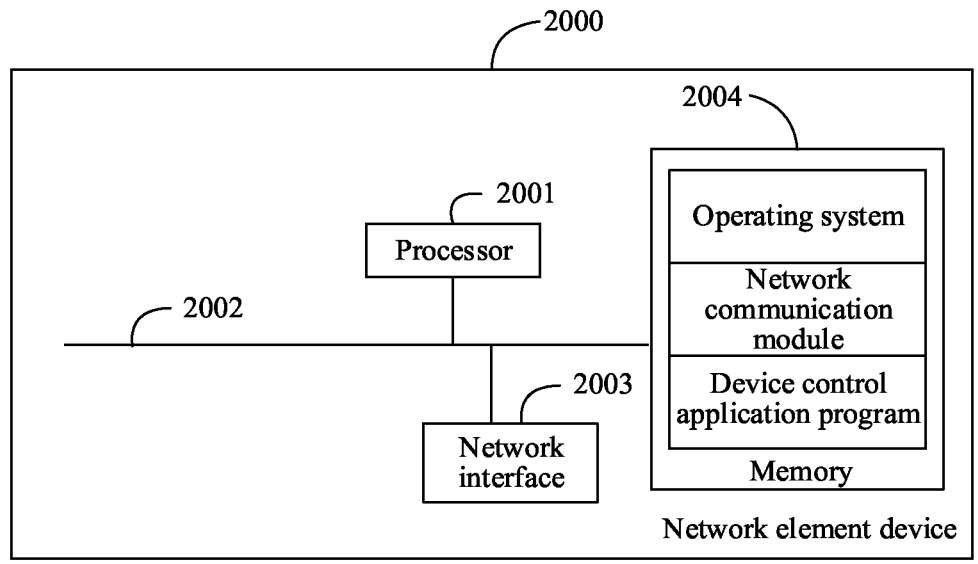
FIG. 14 is a schematic structural diagram of another network element device provided by an embodiment of this application.

With reference to FIG. 14, FIG. 14 is a schematic structural diagram of another network element device provided by an embodiment of this application. As shown in FIG. 14, the network element device 2000 may include: a processor 2001, a network interface 2003, and a memory 2004. In addition, the aforementioned network element device 2000 may further include: at least one communication bus 2002. The communication bus 2002 is configured to implement connection and communication between these components. In some embodiments, the network interface 2003 may include a standard wired interface and a standard wireless interface (such as a Wi-Fi interface). The memory 2004 may be a high-speed RAM memory, and may also be a non-volatile memory, for example, at least one magnetic disk memory. In some embodiments, the memory 2004 may further be at least one storage apparatus far away from the aforementioned processor 2001. As shown in FIG. 14, the memory 2004 used as a computer-readable storage medium may include an operating system, a network communication module, and a device control application program. In the embodiment of this application, the network element device 2000 may be a policy control network element.

In the network element device 2000 shown in FIG. 14, the network interface 2003 may provide a network communication network element. The processor 2001 may be configured to invoke the device control application program stored in the memory 2004, to cause the network element device 2000 to:
 generate a node-level message processing rule set, where the message processing rule set includes one or more message processing rules; and
 distribute the message processing rule set to an edge application server discovery network element, so that the edge application server discovery network element processes a received domain name system message according to the message processing rule set in a subsequent protocol data unit session process.

It is to be understood that the network element device 2000 described in the embodiment of this application may implement the description of a data processing method in the embodiment corresponding to FIG. 5, and details are not described herein again. In addition, the beneficial effects of the same method are not described herein again.

Figure 15:
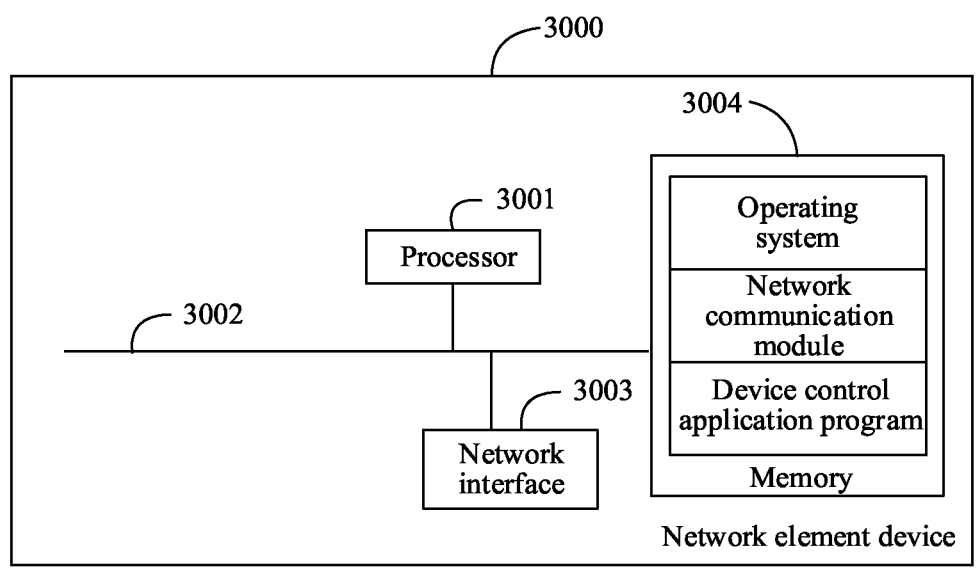
FIG. 15 is a schematic structural diagram of another network element device provided by an embodiment of this application.

With reference to FIG. 15, FIG. 15 is a schematic structural diagram of a network element device provided by an embodiment of this application. As shown in FIG. 15, the network element device 3000 may include: a processor 3001, a network interface 3003, and a memory 3004. In addition, the aforementioned network element device 3000 may further include: at least one communication bus 3002. The communication bus 3002 is configured to implement connection and communication between these components. In some embodiments, the network interface 3003 may include a standard wired interface and a standard wireless interface (such as a Wi-Fi interface). The memory 3004 may be a high-speed RAM memory, and may also be a non-volatile memory, for example, at least one magnetic disk memory. In some embodiments, the memory 3004 may further be at least one storage apparatus far away from the aforementioned processor 3001. As shown in FIG. 15, the memory 3004 used as a computer-readable storage medium may include an operating system, a network communication module, and a device control application program. In the embodiment of this application, the network element device 3000 may be an edge application server discovery network element.

In the network element device 3000 shown in FIG. 15, the network interface 3003 may provide a network communication network element. The processor 3001 may be configured to invoke the device control application program stored in the memory 3004, to cause the network element device 3000 to:

obtain a node-level message processing rule set when establishing a connection with a session management network element, where the message processing rule set includes one or more message processing rules; and obtain, when receiving a domain name system message, a target message processing rule from the one or more message processing rules, and process the domain name system message according to the target message processing rule.

It is to be understood that the network element device 3000 described in the embodiment of this application may implement the description of a data processing method in the embodiment corresponding to FIG. 9, and details are not described herein again. In addition, the beneficial effects of the same method are not described herein again.

In addition, the embodiments of this application further provide a computer-readable storage medium. The computer-readable storage medium stores the computer program executed by the network element apparatus 1 or the network element apparatus 2 or the network element apparatus 3 that is mentioned above; moreover, the aforementioned computer program includes a program instruction; and when executing the aforementioned program instruction, the aforementioned processor may implement the description of the aforementioned data processing method in the aforementioned corresponding embodiments. Therefore, details are not described herein again. In addition, the beneficial effects of the same method are not described herein again. Reference is made to the description of the method embodiments of this application for technical details that are not described in the computer-readable storage medium embodiments of this application.

The computer-readable storage medium may be an internal storage unit of the data processing apparatus or the network element device provided by any aforementioned embodiment, for example, a hard disk or an internal memory of the network element device. The computer-readable storage medium may also be an external storage device of the network element device, such as a plug-in hard disk, a smart media card (SMC), a secure digital (SD) card, a flash card, etc., configured on the network element device. Furthermore, the computer-readable storage medium may further include the internal storage unit and the external storage device of the network element device. The computer-readable storage medium is used for storing the computer program and other programs and data required by the network element device. The computer-readable storage medium may further be used for temporarily storing data that has been outputted or is about to be outputted.

In addition, it is to be pointed out that: the embodiments of this application further provide a computer program product or a computer program. The computer program product or the computer program includes a computer instruction, and the computer instruction is stored in the computer-readable storage medium. The processor of the network element device reads the computer instruction from the computer-readable storage medium, and executes the computer instruction, to cause the network element device to implement the method provided by the embodiment corresponding to any one of FIG. 3, FIG. 5, and FIG. 9.

The method and related apparatus provided by the embodiments of this application are described with reference to the method flowcharts and/or schematic structural diagrams provided by the embodiments of this application. Specifically, each process and/or block of the method flowcharts and/or schematic structural diagrams, and combination of processes and/or blocks in the flowcharts and/or block diagrams may be implemented by computer program instructions. These computer program instructions may be provided to a general-purpose computer, a dedicated computer, an embedded processor, or a processor of another programmable data processing device to generate a machine, so that the instructions executed by the computer or the processor of the another programmable data processing device generate an apparatus for implementing a specified function in one or more processes in the flowcharts and/or in one or more blocks in the schematic structural diagrams. These computer program instructions may also be stored in a computer-readable memory that may guide the computer or another programmable data processing device to work in a specific manner, so that the instructions stored in the computer-readable memory generate a product including an instruction apparatus. The instruction apparatus implements a specified function in one or more processes in the flowcharts and/or in one or more blocks in the block diagrams. These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. What is disclosed above is merely exemplary embodiments of this application, and certainly is not intended to limit the scope of the claims of this application. Therefore, equivalent variations made in accordance with the claims of this application shall fall within the scope of this application.

What is claimed is:

1. A data processing method performed by a computer device acting as a session management network element, the method comprising:

generating a node-level message processing rule set, the message processing rule set comprising one or more message processing rules; and when the session management network element establishes a connection with an edge application server discovery network element, distributing the message processing rule set to the edge application server discovery network element, wherein the edge application server discovery network element processes a received domain name system message according to the message processing rule set in a subsequent protocol data unit session process;

obtaining rule update information;

performing rule update on the message processing rule set according to the rule update information; and distributing an updated message processing rule set to the edge application server discovery network element.

2. The method according to claim 1, wherein each message processing rule in the message processing rule set comprises a message detection template and a message processing operation.

3. The method according to claim 2, wherein the message detection template comprises one or more of a query request message detection template and a query response message detection template; the message processing operation comprises one or more of a content reporting operation, a forwarding operation, a buffer waiting operation, and a transmitting operation; and the forwarding operation comprises an option creation operation or an address replacement operation.

4. The method according to claim 2, wherein each message processing rule further comprises a rule priority; and the rule priority represents an order in which each message processing rule is executed.

5. The method according to claim 2, wherein each message processing rule further comprises a rule identifier; and the rule identifier is an identifier for distinguishing and marking each message processing rule.

6. The method according to claim 2, wherein each message processing rule further comprises a life cycle and a rule level; the life cycle represents a valid time range of each message processing rule; and the rule level is a node level.

7. The method according to claim 1, wherein the method further comprises:

storing the message processing rule set to a unified data repository network element; and the distributing the message processing rule set to the edge application server discovery network element comprises:

obtaining the message processing rule set from the unified data repository network element, and forwarding the message processing rule set to the edge application server discovery network element.

8. A computer device acting as a session management network element, comprising: a processor, a memory, and a network interface;

the processor being connected to the memory and the network interface; the network interface being used for providing a data communication function; the memory storing a program code that, when executed by the processor, causes the session management network element to perform a data processing method including:

generating a node-level message processing rule set, the message processing rule set comprising one or more message processing rules;

when the session management network element establishes a connection with an edge application server discovery network element, distributing the message processing rule set to the edge application server discovery network element, wherein the edge application server discovery network element processes a received domain name system message according to the message processing rule set in a subsequent protocol data unit session process;

obtaining rule update information;

performing rule update on the message processing rule set according to the rule update information; and distributing an updated message processing rule set to the edge application server discovery network element.

9. The computer device according to claim 8, wherein each message processing rule in the message processing rule set comprises a message detection template and a message processing operation.

10. The computer device according to claim 9, wherein the message detection template comprises one or more of a query request message detection template and a query response message detection template; the message processing operation comprises one or more of a content reporting operation, a forwarding operation, a buffer waiting operation, and a transmitting operation; and the forwarding operation comprises an option creation operation or an address replacement operation.

11. The computer device according to claim 9, wherein each message processing rule further comprises a rule priority; and the rule priority represents an order in which each message processing rule is executed.

12. The computer device according to claim 9, wherein each message processing rule further comprises a rule identifier; and the rule identifier is an identifier for distinguishing and marking each message processing rule.

13. The computer device according to claim 9, wherein each message processing rule further comprises a life cycle and a rule level; the life cycle represents a valid time range of each message processing rule; and the rule level is a node level.

14. The computer device according to claim 8, wherein the method further comprises:

storing the message processing rule set to a unified data repository network element; and the distributing the message processing rule set to the edge application server discovery network element comprises:

obtaining the message processing rule set from the unified data repository network element, and forwarding the message processing rule set to the edge application server discovery network element.

15. A non-transitory computer-readable storage medium, storing a computer program that, when executed by a processor of a computer device acting as a session management network element, causes the computer device to perform a data processing method including:

generating a node-level message processing rule set, the message processing rule set comprising one or more message processing rules;

when the session management network element establishes a connection with an edge application server discovery network element, distributing the message processing rule set to the edge application server discovery network element, wherein the edge application server discovery network element processes a received domain name system message according to the message processing rule set in a subsequent protocol data unit session process;

obtaining rule update information;

performing rule update on the message processing rule set according to the rule update information; and distributing an updated message processing rule set to the edge application server discovery network element.

16. The non-transitory computer-readable storage medium according to claim 15, wherein each message processing rule in the message processing rule set comprises a message detection template and a message processing operation.

17. The non-transitory computer-readable storage medium according to claim 15, wherein the method further comprises:
- storing the message processing rule set to a unified data repository network element; and
- the distributing the message processing rule set to the edge application server discovery network element comprises:
- obtaining the message processing rule set from the unified data repository network element, and forwarding the message processing rule set to the edge application server discovery network element.

* * * * *